Aug. 25, 1964     L. A. HAUTAU     3,145,587
MULTIPLE STATION MACHINE

Filed Feb. 15, 1962     3 Sheets-Sheet 1

INVENTOR.
LLEWELLYN A. HAUTAU
BY
ATTORNEYS

Aug. 25, 1964     L. A. HAUTAU     3,145,587

MULTIPLE STATION MACHINE

Filed Feb. 15, 1962     3 Sheets-Sheet 3

INVENTOR.
LLEWELLYN A. HAUTAU
BY
ATTORNEYS

United States Patent Office 3,145,587
Patented Aug. 25, 1964

3,145,587
MULTIPLE STATION MACHINE
Llewellyn A. Hautau, 16918 Littlefield, Detroit 35, Mich.
Filed Feb. 15, 1962, Ser. No. 173,579
8 Claims. (Cl. 77—32.2)

This invention has reference to a machine for sequentially performing a number of operations on a workpiece and more particularly to a machine which simultaneously performs each operation of a sequence to a plurality of points on each workpiece.

The conventional multiple spindle drilling machine consists of a plurality of chucks spaced along a circle, and a matching set of drilling or cutting tools adapted to simultaneously drill or cut each workpiece. After each cutting operation, either the chucks or the cutting tools are rotated so that each workpiece is then disposed before the next cutting tool.

However, the conventional machine is not adaptable to the performance of a plurality of cutting operations on a plurality of holes in the same workpiece. This problem is encountered, for example, in motor end-bells which include bolt-circles. A series of operations such as drilling, reaming, and tapping are required on each hole and a plurality of identical, spaced holes are required on each workpiece.

With the present invention, a plurality of operations may be performed on a plurality of points on each workpiece. This is achieved by providing each workholder with a rotational motion about its axis as well as the ability to rotatively translate between successive cutting or forming stations. In addition to these two types of rotational motion, relative translational motion between the tools and the chucks in a direction perpendicular to the extension of the tools is employed.

Thus, if each of four holes on a workpiece must be drilled, reamed and tapped, a workpiece is first loaded in a chuck which is moved adjacent a drill. Each of the four holes is drilled and the chuck is rotated about its axis between drillings so as to bring successive points on the workpiece into the cutting position. The chuck is then translated to the next tool station by rotating it about a point displaced from its axis. Each of the four holes is then reamed before the chuck is moved to the tap station. A workpiece is operated on in each station simultaneously.

The tools may be moved radially with respect to the axes of the chucks between operations on successive holes. Also, the rotation of the chucks need not be uniform between each pair of holes. The tools may therefore operate on any series of points on a surface of the workpieces.

The chucks all move in unison with one another and the radial motions of the tools are tied together so that each tool operates on the same pattern of holes.

In a preferred embodiment of the present invention, which will be subsequently described in detail, the machine is illustrated as comprising a series of cutting tools mounted in a vertical frame translatable both in the vertical direction and in the forward direction parallel to the extension of the tools. A cylindrical drum containing a plurality of chucks disposed to releasably hold the workpieces in the path of the advancing tools is rotatable about its central axis. A gear mounted in the center of the face of the drum is adapted to rotate the chucks about their central axes.

The simplicity of the three components of motion essential to this invention makes it especially adaptable to numerical control.

Other objects and advantages of the present invention will be readily apparent from the following detailed description wherein is illustrated the preferred embodiment of the present invention.

The description refers to the accompanying drawings in which.

Figure 1:
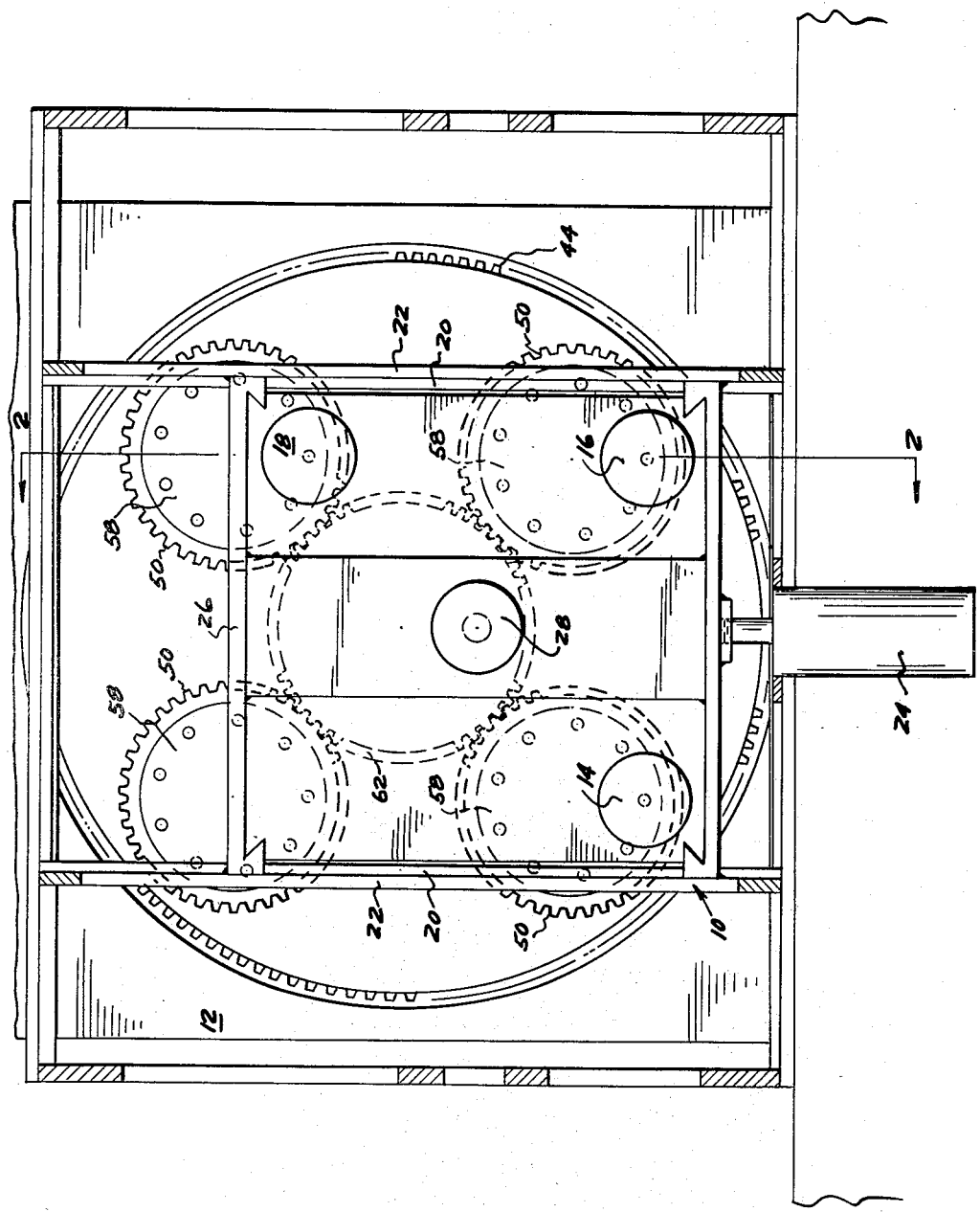
FIG. 1 is an elevational view of a preferred embodiment of the present invention.
Figure 2:
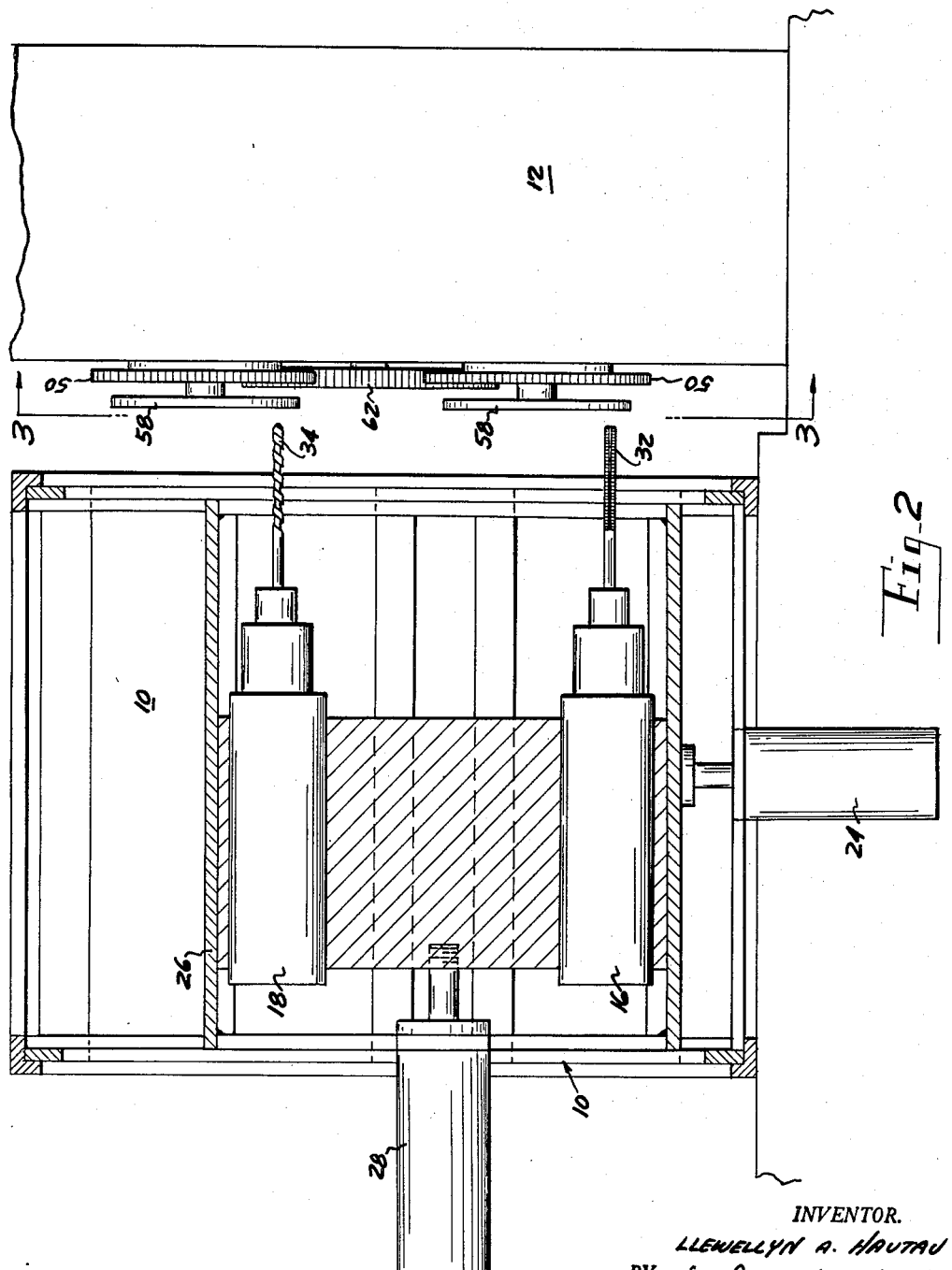
FIG. 2 is a sectional view taken along the lines 2—2 in FIG. 1.
Figure 4:
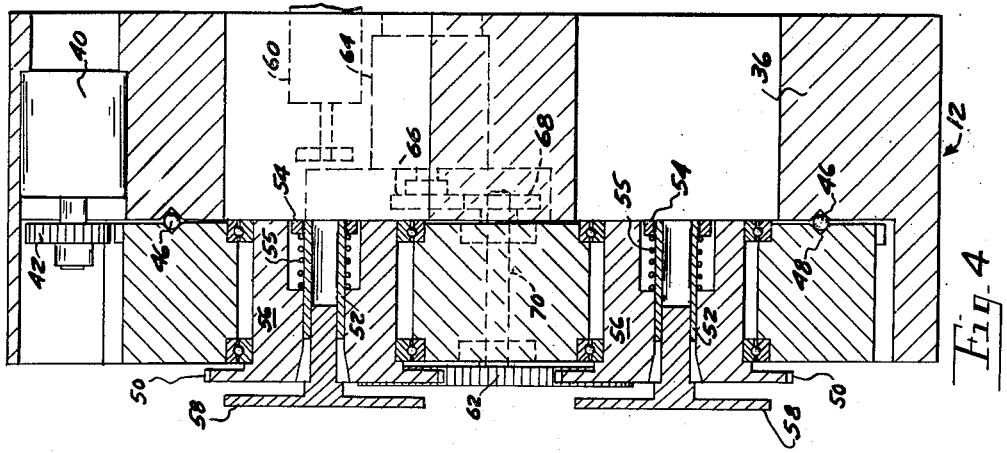
FIG. 4 is a sectional view taken along the lines 4—4 in FIG. 3.
Figure 3:
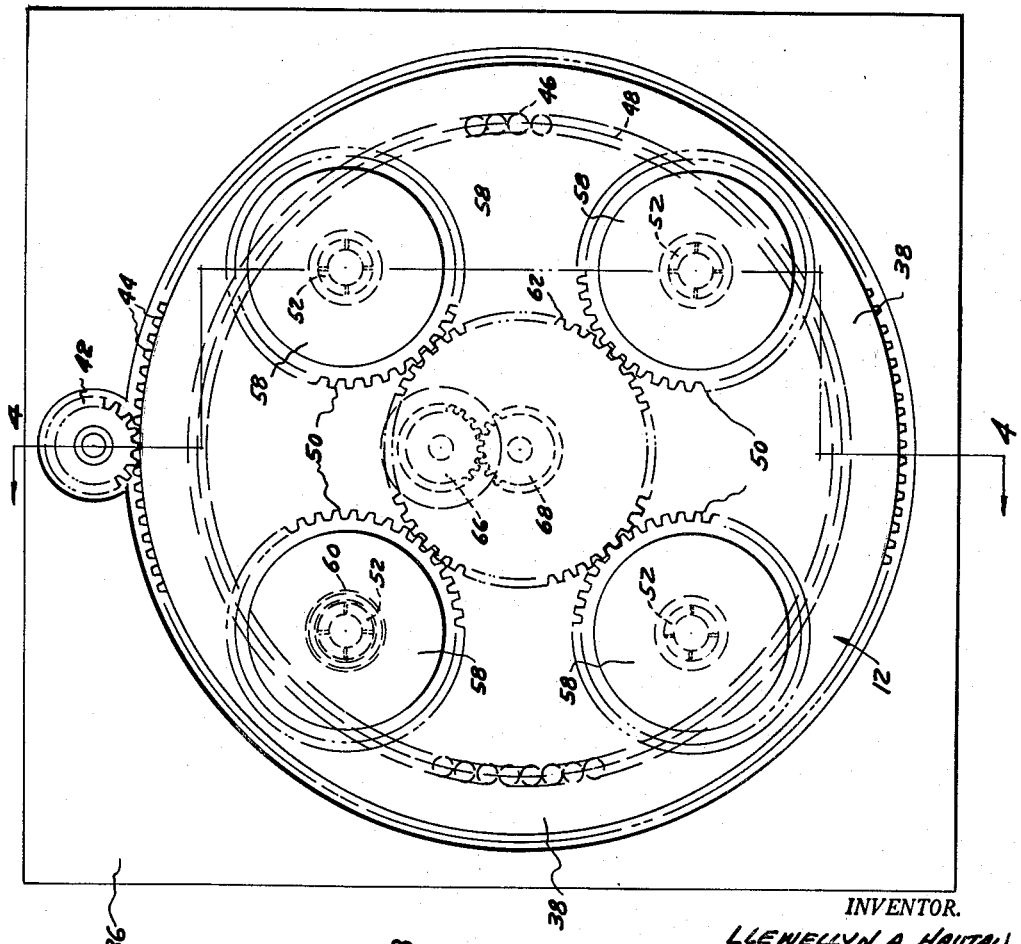
FIG. 3 is a sectional view taken along the lines 3—3 in FIG. 2.

Referring to the drawings in detail, the invention is illustrated as basically comprising a cutting rig 10 and a workholder 12.

The rig 10 consists of three tool holders 14, 16, and 18, mounted in a vertical frame 20 movable along vertical supports 22 by a hydraulic cylinder 24. The tool holders are also movable in the horizontal direction along horizontal supports 26, such motion being induced by a hydraulic cylinder 28. Each of the tool holders 14, 16, and 18 is adapted to securely hold and rotate a tool 30, 32, and 34 of a different type.

The workholder 12 consists of a stationary vertical frame 36 having a rotatable drum 38 mounted on the face of the frame facing the cutting tools 30, 32, and 34. A motor 40 rotates a small gear 42 which engages gear teeth 44 along the perimeter of the drum. The drum rotates on bearings 46 located along a groove 48 between the drum 38 and the frame 36.

Four collet chucks 50 are spaced about the face of the drum 38. The distance between adjacent chucks is equal to that between adjacent cutting tools 30, 32, and 34.

Each collet chuck 50 is comprised of collets 52 having a flange 54 at the end adjacent the frame 36. A spring 55 holds the collets against the frame. The chuck barrel 56 is arranged so that the introduction of a workpiece 58 into the chuck 50 forces the collets against the barrel 56 wedging the workpiece 58 firmly in place, preventing movement during the cutting operations.

An actuator 60, mounted in the frame 36 behind one of the four chucks 50, is adapted to move forward and push the collets 52 forward against the pressure of the spring 55 after the cutting operations, thus allowing the removal of the workpiece 58.

A central gear 62, mounted on the face of the drum 38, is driven by a motor 64 which rotates gears 66 and 68 connected to the axis 70 of the central gear 62. As the central gear 62 rotates, it engages gear teeth about the periphery of the four collet chucks 50 and causes them to rotate about their central axes.

In operation, the workpiece 58 is pushed into the chuck 50 immediately in front of the actuator 60. The motor 40 is actuated, rotating the drum 38 until the workpiece 58 is directly in front of the first cutting tool 30. The motor 64 is actuated, rotating the central gear 62 and each of the chucks 50. The vertical frame 20 is translated vertically until the tool 30 is directly before the desired point on the face of the workpiece 58. The tools are then actuated and moved forward until the cutting operation is completed. The tools are then retracted.

The next workpiece is then inserted into the appropriate chuck 50 and these operations repeated. When a workpiece which has received each of the cutting operations is once again positioned in front of the actuator 60, the advancing actuator forces the workpiece out, and a new workpiece is inserted.

The machine of the present invention may be operated continuously; after each cutting operation a finished workpiece is removed and a new workpiece is inserted in its place. The new workpiece is then alternately rotated and cut until it is pushed out of its chuck 50 by the actuator 60.

It is to be noted that the number of chucks 50 and hence the number of tools 30, 32, and 34 are in no way limited to that shown in the above embodiment. Any number of chucks may be employed spaced at equal distances about the circumference of a circle providing that these distances correspond to the distance between adjacent drilling tools.

The cylinder 24 may be actuated between rotations of the motor 40 in order to accommodate the machine to workpieces in which the pattern of holes is not circular. Alternatively, the position of the cylinder 24 may only be adjusted when a new workpiece is to be operated on.

Having described my invention in its simplest terms, it is to be understood that the features of construction may be changed and varied in greater or lesser degree without departing from the essence of the invention defined in the appended claims.

I claim:

1. A machine of the type described, comprising:
   a plurality of cutting tools having parallel axes and being rotatable about said axes, said tools being disposed at equally spaced points about the circumference of a first imaginary circle lying in a first plane;
   a plurality of rotatable chucks disposed at equally spaced points along a second imaginary circle lying in a second plane parallel to said first plane, said second circle being equal in diameter to said first circle, the axes of said chucks extending perpendicularly to said planes, the distance between the axes of adjacent chucks being equal to the distance between the axes of adjacent tools, and the axis of each of said chucks being laterally displaced from the axis of the corresponding cutting tool when said chucks and tools are disposed in cutting position;
   means for rotating said tools;
   means for incrementally rotating each of said chucks about its central axis;
   means for achieving relative rotational motion between said tools and said chucks whereby said tools are disposed in operating position before successive chucks;
   and means for achieving relative motion between said tools and said chucks in the direction parallel to the extension of said tools.

2. A machine of the type described, comprising:
   a plurality of chucks disposed at points along a plane having their axes extending perpendicularly to said plane, said chucks being evenly spaced about the circumference of an imaginary circle lying in said plane;
   a plurality of cutting tools having parallel axes and being rotatable about said axes, said tools numbering one less than the number of said chucks and extending parallel to the axes of said chucks, said tools being disposed in a spaced relation with each other corresponding to the spaced relation between said chucks, the axes of said cutting tools being laterally displaced from the axes of said chucks when said tools and chucks are disposed in cutting position;
   means for rotating said tools;
   means for incrementally rotating each of said chucks about its central axis;
   means for achieving relative rotational motion between said tools and said chucks whereby said tools are disposed in operating position before successive chucks;
   and means for achieving relative motion between said tools and said chucks in the direction parallel to the extension of said tools.

3. A machine of the type described, comprising:
   a plurality of cutting tools having parallel axes and being rotatable about said axes, said tools being disposed at equally spaced points about the circumference of a first imaginary circle lying in a first plane;
   a rotatable cylindrical drum having its axis extending parallel to the extension of said cutting tools;
   a plurality of rotatable chucks disposed at equally spaced points along a second imaginary circle lying in the face of said drum adjacent said tools, said second circle being equal in diameter to said first circle, said chucks having their axes laterally displaced from the axes of said cutting tools when said chucks and tools are disposed in the cutting position and extending parallel to the extension of said tools, the distance between the axes of adjacent chucks being equal to the distance between the axes of adjacent tools;
   means for rotating said tools;
   means for incrementally rotating each of said chucks about its central axis;
   means for incrementally rotating said drum about its axis;
   and means for achieving relative motion between said tools and said chucks in the direction parallel to the extension of said tools.

4. A machine of the type described, comprising:
   a plurality of cutting tools having parallel axes and being rotatable about said axes, said tools being disposed at equally spaced points about the circumference of a first imaginary circle lying in a first plane;
   a rotatable gear lying in a second plane parallel to said first plane;
   a plurality of rotatable chucks disposed at equally spaced points along a second imaginary circle lying in said second plane about the perimeter of said gear, said second circle being equal in diameter to said first circle, the axes of said chucks being laterally displaced from the axes of said cutting tools when said chucks and tools are disposed in cutting position and extending perpendicularly to said planes, the distance between the axes of adjacent chucks being equal to the distance between the axes of adjacent tools, each of said chucks being adapted to be simultaneously rotated by rotation of said gear;
   means for rotating said tools;
   means for incrementally rotating said gear;
   means for achieving relative rotational motion between said tools and said chucks whereby said tools are disposed in operating position before successive chucks;
   and means for achieving relative motion between said tools and said chucks in the direction parallel to the extension of said tools.

5. A machine of the type described, comprising:
   a plurality of cutting tools having parallel axes and being rotatable about said axes, said tools being disposed at equally spaced points about the circumference of a first imaginary circle lying in a first plane;
   a rotatable cylindrical drum having its axis extending parallel to the extension of said cutting tools;
   a rotatable gear mounted about the axis of said drum on the face of said drum adjacent said cutting tools;
   a plurality of rotatable chucks disposed at equally spaced points along a second imaginary circle lying in the face of said drum about the perimeter of said gear, said second circle being equal in diameter to said first circle, the axes of said chucks being laterally displaced from the axes of said cutting tools when said chucks and tools are disposed in cutting position and extending perpendicularly to said face, the distance between the axes of adjacent chucks being equal to the distance between the axes of adjacent tools, each of said chucks being adapted to be simultaneously rotated by rotation of said gear;
   means for rotating said tools;
   means for incrementally rotating said drum about its axis;

means for incrementally rotating said gear independently of said drum about the axis of said drum;

and means for achieving relative motion between said tools and said chucks in the direction parallel to the extension of said tools.

6. A machine of the type described, comprising:

a first stationary support;

a frame movable within said support in a first direction and in a second direction perpendicular to said first direction;

a plurality of cutting tools having parallel axes mounted in said frame, extending in said first direction and being rotatable about said axes, said tools being situated at equally spaced points about the circumference of a first imaginary circle lying in a first plane;

a secondary stationary support;

a rotatable cylindrical drum mounted in said second support adjacent the cutting ends of said cutting tools, the axis of said drum extending parallel to the extension of said cutting tools;

a rotatable gear mounted about the axis of said drum on the face of said drum adjacent said cutting tools;

a plurality of rotatable chucks lying in a plane of said gear and mounted at equal intervals about the perimeter of said gear, the axes of said chucks extending parallel to the extension of said tools, the spaced relation between said chucks corresponding to the spaced relation between said tools, each of said chucks being adapted to be simultaneously rotated by rotation of said gear;

means for rotating said drum about its axis;

means for rotating said gear independently of said drum about the axis of said drum;

means operative to move said frame in said first direction;

means operative to move said frame in said second direction;

and means for rotating said tools.

7. A machine of the type described, comprising:

a plurality of cutting tools having parallel axes and being rotatable about said axes, said tools being disposed at equally spaced points about the circumference of a first imaginary circle lying in a first plane;

a plurality of rotatable chucks disposed at equally spaced points along a second imaginary circle lying in a second plane parallel to said first plane, said second circle being equal in diameter to said first circle, the axes of said chucks extending perpendicularly to said planes, the distance between the axes of adjacent chucks being equal to the distance between the axes of adjacent tools;

means for rotating said tools;

means for incrementally rotating each of said chucks about its central axis;

means for achieving relative rotational motion between said tools and said chucks whereby said tools are disposed in operating position before successive chucks;

means for achieving relative motion between said tools and said chucks in the direction parallel to the extension of said tools;

and means for achieving relative linear motion between said tools and said chucks in a direction perpendicular to the extension of said tools.

8. A machine of the type described, comprising:

a plurality of cutting tools having parallel axes and being rotatable about said axes, said tools being disposed of equally spaced points about the circumference of a first imaginary circle lying in a first plane;

a rotatable gear lying in a second plane parallel to said first plane;

a plurality of rotatable chucks disposed at equally spaced points along a second imaginary circle lying in said second plane about the perimeter of said gear, said second circle being equal in diameter of said first circle, the axes of said chucks extending perpendicularly to said planes, the distance between the axes of adjacent chucks being equal to the distance between the axes of adjacent tools, each of said chucks being adapted to be simultaneously rotated by rotation of said gear;

means for rotating said tools;

means for incrementally rotating said gear;

means for achieving relative rotational motion between said tools and said chucks whereby said tools are disposed in operating position before successive chucks;

means for achieving relative motion between said tools and said chucks in the direction parallel to the extension of said tools;

and means for achieving relative linear motion between said tools and said chucks in a direction perpendicular to the extension of said tools.

References Cited in the file of this patent

UNITED STATES PATENTS

| | | |
|---|---|---|
| 1,033,837 | Smith | July 30, 1912 |
| 2,953,069 | Smith | Sept. 20, 1960 |
| 2,953,949 | Witzig et al. | Sept. 27, 1960 |
| 2,969,553 | Hatherell et al. | Jan. 31, 1961 |
| 2,974,548 | Miller | Mar. 14, 1961 |